July 20, 1937.  D. H. N. MAYO  2,087,734
FURNACE
Original Filed Nov. 16, 1931  6 Sheets-Sheet 1

INVENTOR
Dana H. N. Mayo
BY
ATTORNEY

July 20, 1937.  D. H. N. MAYO  2,087,734
FURNACE
Original Filed Nov. 16, 1931  6 Sheets-Sheet 3
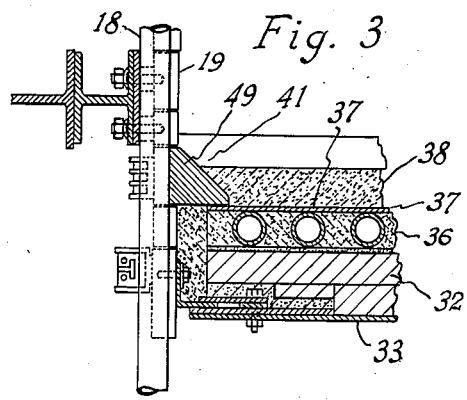
Fig. 3
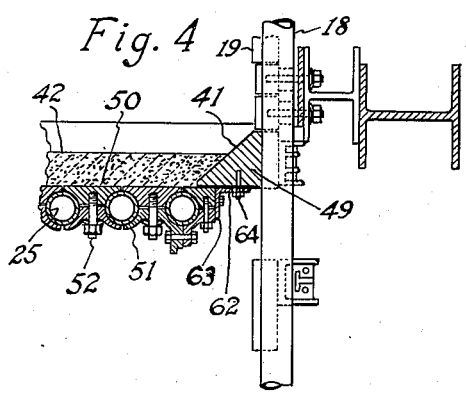
Fig. 4
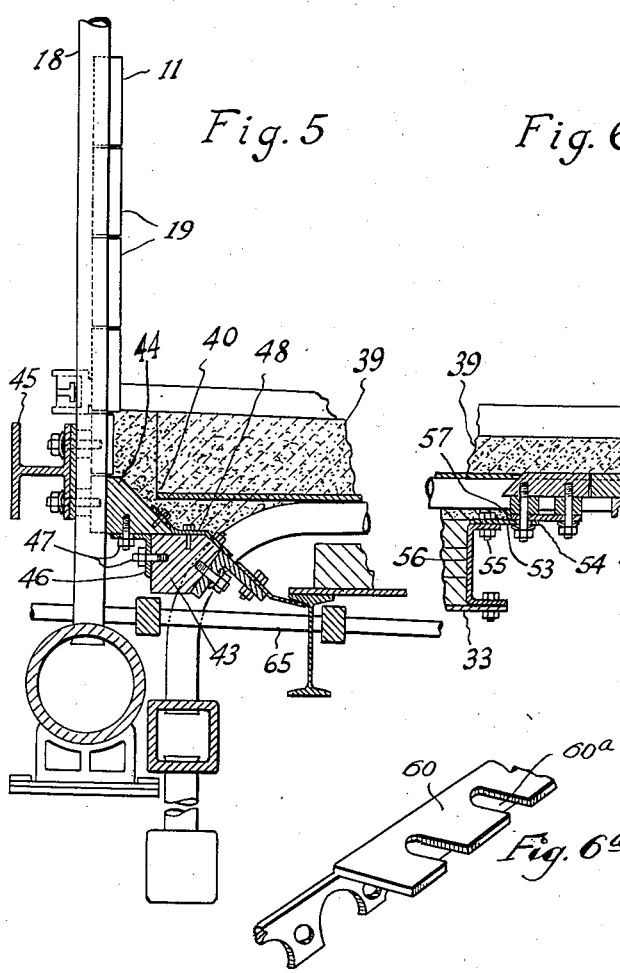
Fig. 5  Fig. 6
Fig. 6ᵃ
INVENTOR
Dana H. N. Mayo
BY
ATTORNEY July 20, 1937.  D. H. N. MAYO  2,087,734
FURNACE
Original Filed Nov. 16, 1931   6 Sheets-Sheet 5

INVENTOR
Dana H. N. Mayo
BY
ATTORNEY

July 20, 1937.　　　D. H. N. MAYO　　　2,087,734
FURNACE
Original Filed Nov. 16, 1931　　6 Sheets-Sheet 6

INVENTOR
Dana H. N. Mayo
BY
ATTORNEY

Patented July 20, 1937

2,087,734

UNITED STATES PATENT OFFICE 2,087,734

FURNACE

Dana H. N. Mayo, Ridgewood, N. J., assignor, by mesne assignments, to The Babcock & Wilcox Company, Newark, N. J., a corporation of New Jersey Continuation of application Serial No. 575,493, November 16, 1931. This application October 9, 1934, Serial No. 747,547

25 Claims. (Cl. 122—235)

My invention has to do with furnaces and more particularly to furnaces for burning a slag-forming fuel wherein the side walls and floor are formed of fluid-cooled tubes with means for closing the spaces between tubes; this application being a continuation of my copending application, Serial No. 575,493, filed November 16, 1931, for furnace.

An object of the invention is to provide such a furnace wherein the fluid-cooled tubes in the floor are in a circulation system separate from that of the tubes in the side walls.

A further object is to provide a furnace of the above type wherein the floor and at least the lower portions of the side walls are so constructed as to sustain a pool of molten slag thereon, and wherein provision is made for expansion of the floor relative to the side walls and wherein liquid-tight seals are provided along the marginal portions of the floor.

These and other objects are effected by my invention as will be apparent from an examination of the following description and claims taken in connection with the accompanying drawings, in which:

Fig. 3 is a transverse vertical section taken on the line III—III of Fig. 2, and on a further enlarged scale;

Fig. 4 is a transverse vertical section taken on the line IV—IV of Fig. 2 and on the same scale as Fig. 3;

Fig. 5 is an enlarged fragmentary vertical section showing more in detail the floor and adjoining side wall structure at the left-hand side of Fig. 2;

Fig. 6 is a view similar in character to Fig. 5 and illustrating the floor and side wall structure at the right-hand side of Fig. 2;

Fig. 6a is a view (broken away) showing one of the details;

Figure 1:
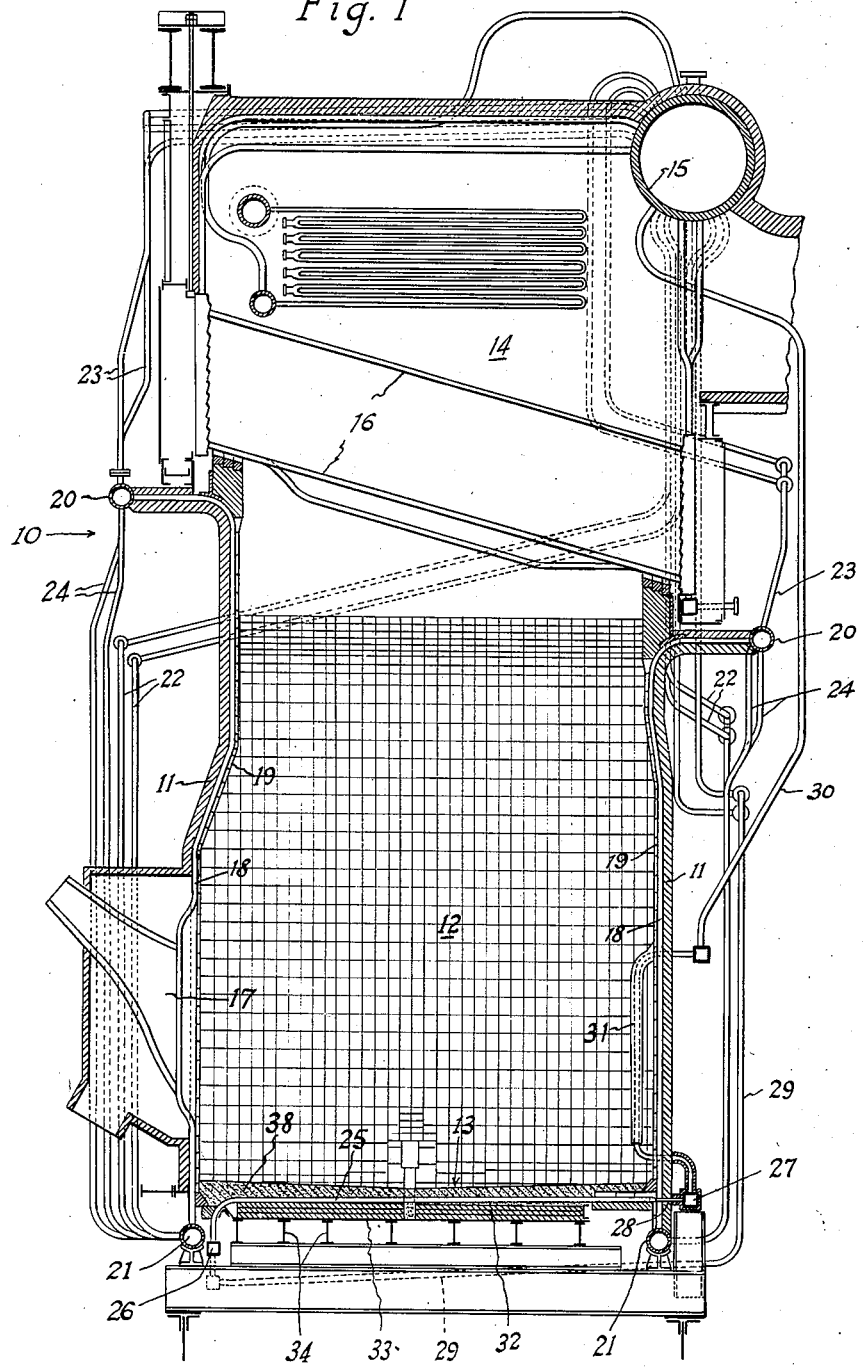
Fig. 1 is a vertical section through a boiler furnace constructed in accordance with the present invention.

Referring now in detail to the construction illustrated and particularly to the embodiment shown in Figs. 1 to 6 inclusive, the reference numeral 10 indicates, in its entirety, a boiler furnace constructed in accordance with the present invention. The furnace comprises upright side walls 11 defining a combustion chamber 12, a bottom wall 13 extending transversely across the lower end of the combustion chamber and between the side walls and a boiler 14 arranged above the combustion chamber and including a steam and water drum 15, water tubes 16 and the usual headers and connections.

The furnace shown is of the type wherein a slag forming fuel, for example, pulverized coal, is burned in suspension in the combustion chamber, the pulverized coal being introduced into the chamber by means of a suitable burner 17. The upright side walls and floor are of the water cooled type, and the floor is constructed to sustain a pool of molten slag or ash resulting from the combustion of the pulverized coal in the chamber 12.

The side walls 11 are formed of spaced parallel water tubes 18, and suitable means for closing the spaces between the tubes, for example, heat resistant blocks 19 secured to the tubes. The tubes 18 are arranged vertically and connect at their ends to upper and lower headers 20 and 21, respectively. Circulation is assured through the wall tubes 18 by downcomers 22 connecting the lower headers 21 with the water space of the steam and water drum 15, by risers 23 connecting the upper headers 20 with the steam space of the drum 15, and by recirculating tubes 24 connecting the headers 20 and 21 to provide local circulation in the wall tubes 18.

The floor 13 is formed of a set of spaced parallel water tubes 25 horizontally inclined and connected at their opposite ends to headers 26 and 27 respectively, the header 26 being positioned below the floor and on the furnace side of the header 21 and the header 27 being positioned externally of the furnace walls as shown. The ends of the tubes 25 adjacent the headers 27 are reduced in diameter, as by swaging indicated at 28, for the purpose of permitting the tubes to pass through the spaces between the side wall tubes (see Fig. 6).

The floor tubes 25 are in a separate circulation system from that of the side wall tubes 18. Downcomers 29 connect the lowermost portion of the steam and water drum 15 with the header 26, and risers 30 connect the header 27 with the lower portion of the steam and water drum 15, but at a higher level than the downcomers 29. The risers 30 re-enter the furnace for a short distance as indicated at 31 to provide a portion thereof exposed directly to the heat of combustion in the furnace, thereby serving as a means for increasing the rate of circulation of fluid through the nearly horizontal floor tubes.

Liquid ash is deposited on the floor of the furnace where rapid combustion of pulverized fuel is carried on. This ash and particularly some of its constituents, is penetrating and exceedingly fluid, and it is necessary to provide a seal which will prevent this liquid from passing through the furnace floor.

Figure 2:
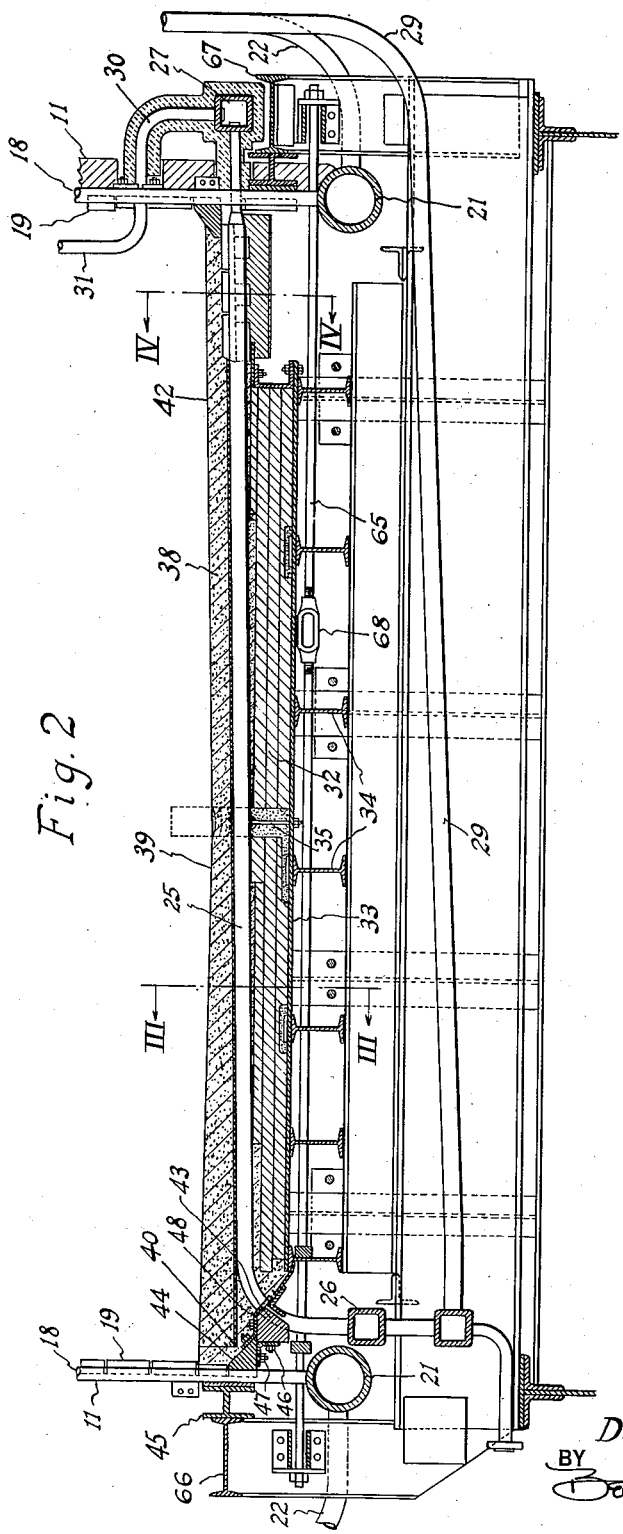
Fig. 2 is a fragmentary enlarged vertical section illustrating the lower portion of the furnace shown in Fig. 1.
Figure 7:
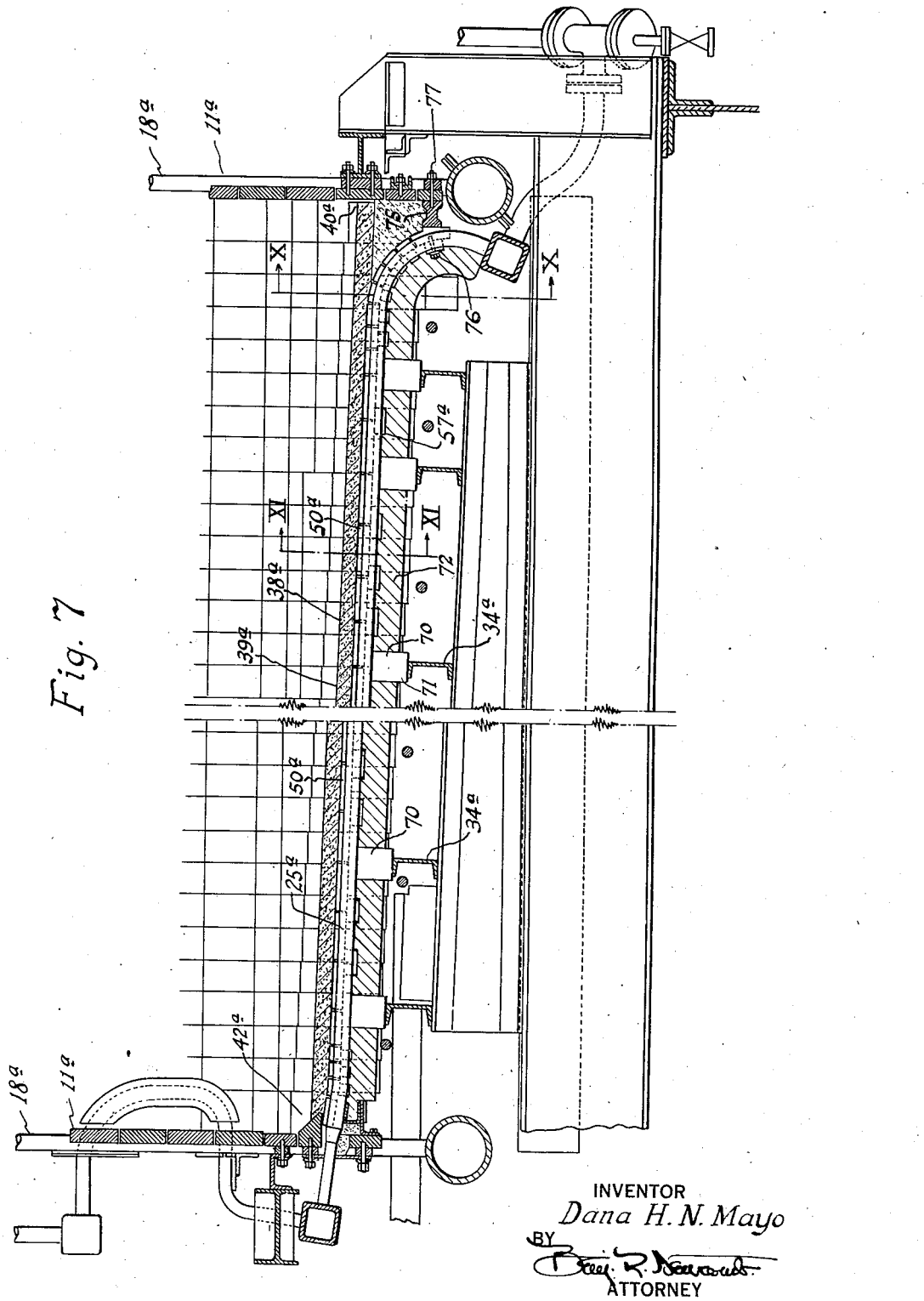
Fig. 7 is a view similar to Fig. 2 illustrating a modified form of my invention.
Figure 8:
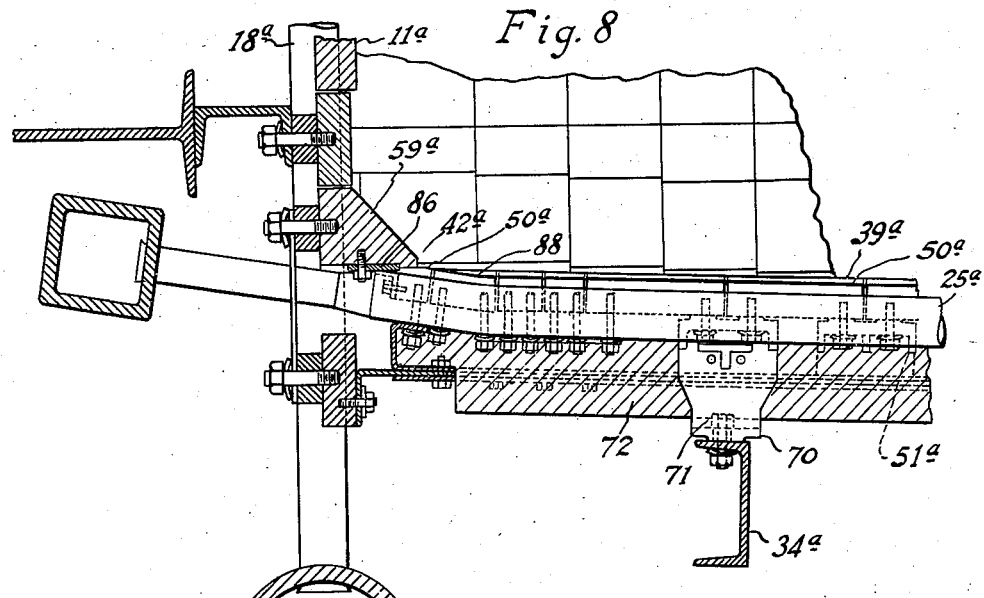
Fig. 8 is an enlarged fragmentary view showing more in detail the side wall and floor structure at the upper and left-hand corner of Fig. 7.
Figure 9:
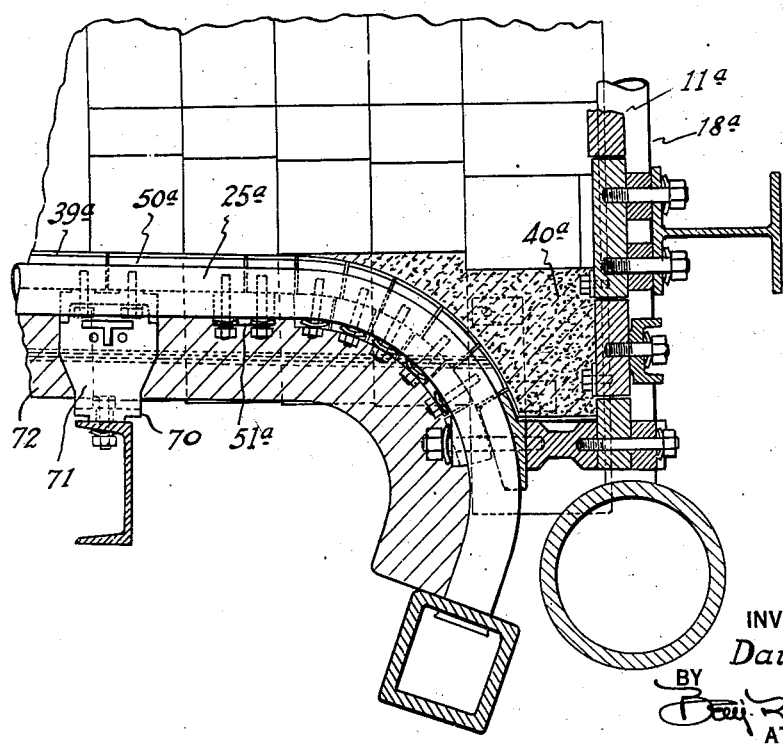
Fig. 9 is a view similar to Fig. 8 illustrating the floor and side wall structure at the lower and right-hand corner of Fig. 7.

In accordance with the present invention the floor 13 may be constructed in a number of different ways. In Figs. 1 to 6 inclusive, I have shown the floor as comprising the set of tubes 25 supported upon one or more layers of refractory material 32, for example, fire brick, which is in turn supported by an external metal casing 33 resting on spaced structural beams 34. In order to prevent the tubes 25 from moving upward under the influence of heat the tubes are held down against the fire brick support 32 by means of suitable securing device 35 connecting the mid-portion of each tube with the casing 33. The spaces between tubes may be closed by any suitable means. In Figs. 2, 3 and 5, I have shown the spaces between tubes as being filled with a granular refractory material 36, for example, magnesite, chromite, or the like. A metallic plate 37 extends over the top of the tubes and the plate 37 is covered over by a layer 38 of any suitable refractory material, for example, the same material as is used by the floor tubes, or by a layer of solidified slag, stoker ash or the like.

The floor comprises a central portion 39 and marginal portions 40, 41 and 42, the marginal portion 40 being at the lower ends of the tubes and adjacent the header 26, the marginal portion 42 being at the opposite and upper ends of the tubes and the marginal portions 41 being at each side of the set of floor tubes 25.

I have provided a means for securely anchoring one end of the tubes to a rigid support and for allowing the opposite ends of the tubes at the marginal portion 42 and the lateral edges of the floor along the marginal portions 41, to expand and contract relative to the side walls due to the influence of changing temperature. The anchoring means may take a variety of forms. The anchoring means shown in Figs. 2 and 5 are comprised of a series of blocks 43, fixed to the floor tubes 25 where they bend down to connect to the headers 26, a series of blocks 44, fixed to the wall tubes 18 and to a structural support 45 at the outside of the walls, and an angle 46 having its flanges rigidly secured as by bolts 47 to the blocks 43 and 44, respectively. In order to prevent the escape of liquid slag which might penetrate the floor, I provide a sealing plate 48 which is also bolted to the blocks 43 and 44 respectively.

At the marginal portions 41 of the floor, I provide a sealing means for preventing the escape of liquid slag, which sealing means permits relative movement between the floor and walls due to expansion and contraction (see Fig. 3). The sealing means consists of a series of blocks 49 which are fixed to the wall tubes 18 and overlap and engage the metal plate 37 extending across the top of the floor tubes 25.

The marginal portion 42 at the upper or higher end of the set of floor tubes is shown in Figs. 4 and 6 as comprising a plurality of blocks 50 closing the spaces between the floor tubes 25 and secured to the tubes by means of rows of clamps 51 and bolts 52. That side of the marginal portion 42 which is adjacent the central portion 39 is secured to such central portion by means of a slip joint seal indicated at 53 which permits relative movement between the central and marginal portion, incident to expansion and contraction but which prevents the escape of liquid slag. The slip joint 53 consists of a plate 54 secured at one side to the adjacent row of clamps 51 by means of the bolts 52 and secured at its other side by means of bolts 55 to the upper flange of a channel member 56, the latter bounding the upper end of the central portion 39. The bolts 55 pass through enlarged openings 57 in the plate 54. The enlarged openings 57 provide for the relative movement aforementioned and the plate 54 provides the seal preventing the escape of liquid. The uppermost side of the marginal portion 42 is secured to the wall tubes 18 by means of a slip joint seal 58. This seal is shown as comprising a row of blocks 59 secured to the tubes 18 and an angle 60 bolted to the adjacent blocks 59 and to the blocks 50 by means of bolts 61 passing through slotted holes 60a in the angle.

It will be observed from an examination of Fig. 4 that a slip joint seal 62 provides for relative expansion between the side marginal portion 41 adjacent the upper marginal portion 42 and the wall tubes and consists of the blocks 49 secured to the side wall tubes 18 and overlapping the blocks 50 carried by the floor tubes 25. An angle 63 connects the blocks 49 and 50 and is secured thereto by means of bolts 64 passing through slotted holes in the angle. As before, the angle and slotted holes permit relative movement of the floor and walls and prevent the escape of liquid slag.

From an examination of Fig. 2, it will be observed that the side walls 11 are prevented from spreading and relative movement thereof with respect to the floor is concentrated in the slip joint seals described above by means of tie-rods 65 connecting structural members 66 and 67 which bear inwardly against the outer portions of the side walls 11. The tension on the tie-rods 65 may be adjusted by means of suitable turnbuckles 68.

Referring now in detail to the modified form shown in Figs. 7 to 11 inclusive, it will be observed that in general, the structure shown is the same as that of the previously described modification. In Figs. 7 to 11 inclusive, the floor tubes 25a in both the central portion 39a and in the upper marginal portion 42a are covered by refractory blocks 50a, similar in construction to the blocks 50 and the blocks 50a are secured to the tubes 25a by rows of clamps 51a. At spaced points, the clamps 51a are omitted and buck-stay clamps 70 are provided which are provided with depending portions 71 bolted to the upper face of the structural members 34a, thereby serving as a means for securely holding the tubes against their support. The upper side of the blocks 50a may be covered by a layer 38a of refractory, such for example as magnesite, chromite, stoker ash or the like. Suitable insulating material 72 may be provided at the underside of the tubes 25a.

Figure 10:
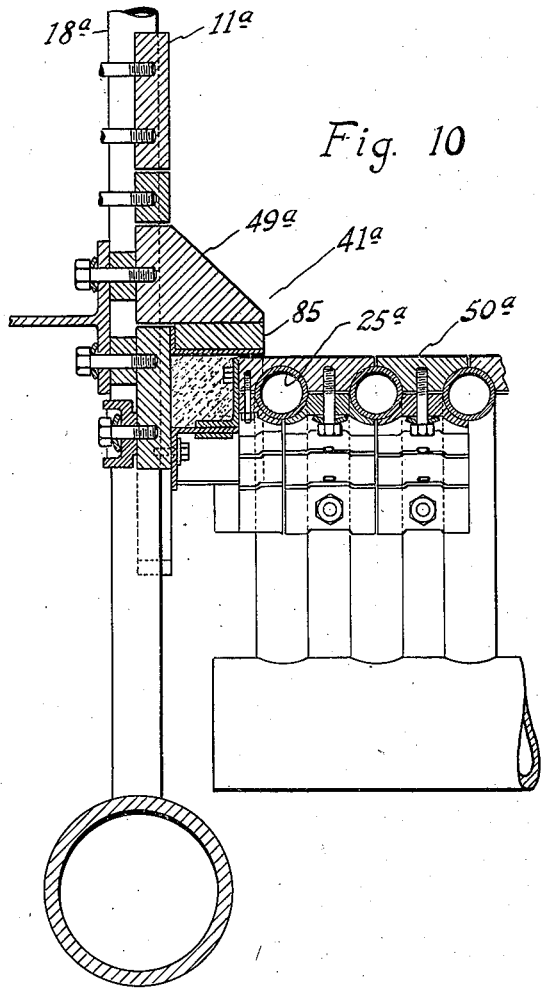
Fig. 10 is a fragmentary vertical section taken on the line X—X of Fig. 7, and being on an enlarged scale.
Figure 11:
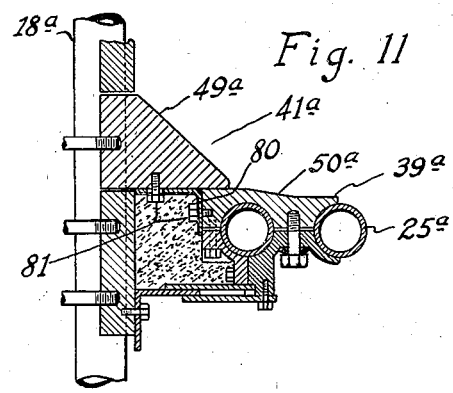
Fig. 11 is a view similar to Fig. 10 taken on the line XI—XI of Fig. 7.

The lower marginal portion 40a is rigidly anchored to the side wall tubes 18a by means of blocks 75 connecting the tubes 18a and 25a by bolts 76 and 77 respectively. The blocks 75 also provide a seal for preventing the escape of liquid slag. A slip joint seal is provided at the marginal portions 41a between the lateral sides of the floor and the side walls 11a and comprises blocks 49a secured to the side wall tubes 18a and overlapping the blocks 50a carried by the floor tubes 25a and an angle 80 secured to the blocks 49a and 50a by bolts 81 passing through slotted holes in the angle and thereby permitting relative expansion (see Fig. 11). In Fig. 10, it will be observed that the side marginal portions 41a adjacent the lower ends of the floor tubes 25a are of slightly different construction from that just described. This latter construction comprises blocks 49a secured to the side wall tubes 18a and spacing blocks 85 disposed beneath the blocks 49a and overlapping the blocks 50a carried between the floor tubes 25a.

A slip joint seal is also provided at the upper marginal portion 42a and comprises blocks 59a secured to the wall tubes and overlapping the blocks 50a carried by the floor tubes 25a. An angle member 86 similar to angle 60 (Fig. 6a) secured to the blocks 59a and 50a by bolts passing through slotted holes provides for expansion and contraction of the parts and prevents the escape of liquid slag. It will be observed that the structure at the upper end of the floor tubes is slightly different from the previously described modification in that the upper ends of these tubes are bent upward at a slightly greater angle as indicated at 88, for the purpose of preventing an accumulation of steam on the furnace side of the heated portions of the floor tubes 25a, and thereby aiding in the circulation of cooling fluid through the floor tubes.

While I have shown my invention in only two forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

I claim:

1. In a furnace, a floor, wall tubes surrounding and defining the limits of said floor, circulation systems including said wall tubes for passing a cooling fluid through said wall tubes, tubes in said floor, and a separate circulation system including said floor tubes for passing cooling fluid through said floor tubes, said floor tubes being swaged near their ends and passing between the wall tubes.

2. In a furnace, a floor, wall tubes surrounding and defining the limits of said floor, circulation systems including said wall tubes for passing a cooling fluid through said wall tubes, sloping tubes in said floor, and a separate circulation system including said floor tubes for passing cooling fluid upwardly through said floor tubes, said floor tubes being swaged near their ends and passing between the wall tubes.

3. In a furnace, a floor, wall tubes surrounding and defining the limits of said floor, circulation systems including said wall tubes for passing a cooling fluid through said wall tubes, tubes in said floor, each tube having one of its ends swaged to pass between the wall tubes, said floor tubes being bent upwardly on the furnace side of said wall to prevent accumulation of steam in the swaged portion of said tubes.

4. In a furnace, a floor, wall tubes on all sides of the furnace chamber surrounding and defining the limits of said floor, circulation systems connected to and arranged for passing a cooling fluid through only said wall tubes, a bank of tubes in said floor, and a separate circulation system connected to and arranged for passing cooling fluid only through said bank of floor tubes in combination with a box header at one end of said bank of floor tubes on the furnace side of an adjacent wall and a second box header at the other end of said bank of floor tubes outside of the furnace.

5. In a furnace, oppositely disposed walls, tubes in said walls, a floor, a tube in said floor, sealing means rigidly fastened to a tube in one of said walls and to said floor tube for preventing the escape of liquid therebetween, and a second sealing means for preventing the escape of liquid between the other of said walls and the floor tube comprising a member rigidly fastened to said floor tube and another member rigidly fastened to one of said tubes in the said other wall, said members being constructed to provide sliding contact therebetween.

6. In a furnace, oppositely disposed walls, tubes in said walls, a floor, a tube in said floor having a bend adjacent one of said walls, sealing means rigidly fastened to a tube in one of said walls and to said floor tube at the bend therein to prevent the escape of liquid therebetween, and a second sealing means for preventing the escape of liquid between the other of said walls and the floor tube comprising a member rigidly fastened to said floor tube and another member rigidly fastened to one of said tubes in said other wall, said members having faces in contact with each other and being constructed and arranged to slide with respect to each other.

7. In a furnace, oppositely disposed walls, a tube in each wall, a floor, a tube in said floor extending into proximity to each of said wall tubes, a seal fastened to one wall tube and to said floor tube, and a second seal comprising a member fastened to said floor tube and another member fastened to the wall tube in the opposite wall, said members being constructed to provide sliding contact therebetween.

8. In a furnace floor constructed to sustain a pool of molten slag thereon, a central portion comprising spaced cooling tubes, refractory material closing the space between the tubes, and an external casing beneath said central portion and to which the tubes are secured; a marginal floor portion comprising extensions of the aforementioned tubes and refractory tile secured to said extensions and closing the spaces between the same; and liquid-tight sealing means between the casing and the marginal floor portion.

9. In a furnace floor constructed to sustain a pool of molten slag, a central portion comprising spaced cooling tubes, refractory material closing the space between the tubes, and an external casing fixed beneath said central portion; a marginal floor portion comprising extensions of the aforementioned tubes and refractory tile secured to said extensions and closing the spaces between the same; and a slip-joint liquid-tight expansible sealing structure between the casing and the marginal floor portion.

10. In a boiler furnace, a floor adapted to sustain a molten slag pool, water tube cooled side walls surrounding and defining the limits of said floor; said floor including a central portion and a marginal portion; said central portion comprising spaced cooling tubes, a refractory material closing the space between said tubes, a fixed support and means for anchoring the central floor portion thereto, said marginal floor portion comprising spaced extensions of the aforesaid tubes, and means to close the spaces between the tube extensions; members secured to the respective floor portions and in overlapping contact to form an expansion joint structure between the marginal floor portion and the central portion; and means to connect the floor tubes to the water spaces of the boiler.

11. In a furnace, the combination of side walls defining a combustion chamber, a floor extending between the side walls and constructed to sustain a pool of molten slag thereon, the floor comprising a set of spaced water circulating tubes and heat-resistant material closing the space between the tubes, means for anchoring the floor at one end of the set of tubes to one of the side walls and including a liquid-tight seal, and means providing for movement of the set of tubes at the other end incident to expansion thereof and including a seal to prevent the escape of liquid.

12. In a furnace, the combination of side walls defining a combustion chamber, a floor extending between the side walls and constructed to sustain a pool of molten slag thereon, the floor comprising a set of spaced water circulating tubes and heat-resistant material closing the space between the tubes, means for anchoring the floor at one end of the set of tubes to one of the side walls and including a liquid-tight seal, and means providing for movement of the floor incident to expansion thereof at the other end and along the sides thereof, the last-named means including a seal for preventing the escape of liquid along the sides of the floor and at said other end.

13. In a furnace, the combination of side walls defining a combustion chamber, a floor extending between the side walls and constructed to sustain a pool of molten slag thereon and comprising a central portion formed of a set of spaced water circulating tubes and heat resistant material closing the space between tubes, the floor also including a marginal portion between the central portion and a side wall, a rigid support, means for anchoring the tubes of said central portion to the support, and means preventing the escape of molten slag between said central and said marginal portion.

14. In a furnace floor constructed to sustain a pool of molten slag, a central portion comprising spaced cooling tubes, refractory material closing the space between the tubes, a marginal floor portion movable relative to said central portion, a fixed support and means anchoring one of said floor portions thereto, and an expansion joint structure including relatively movable parts between the marginal floor portion and the central portion.

15. In a furnace burning a slag forming fuel, side walls including upright cooling tubes, a floor defined by said walls and including spaced cooling tubes, separate fluid circulation systems for said wall tubes and for said floor tubes, means closing the spaces between said floor tubes whereby a pool of molten slag is supported, and tube-carried members on one wall projecting inwardly of the furnace in overlapping contact with said space closure means to form an expansible seal against the escape of molten slag between the floor and side wall.

16. In a furnace burning a slag forming fuel, side walls including upwardly extending cooling tubes, a floor defined by said walls and including spaced cooling tubes, means closing the spaces between said floor tubes whereby a pool of molten slag is supported, and tube-carried members on one wall projecting inwardly of the furnace in overlapping contact with said space closure means to form an expansible seal against the escape of molten slag between the floor and side wall, thereby removing the actual juncture between floor and side wall tube-carried members to a location remote from the tube surfaces.

17. In a furnace floor constructed to sustain a pool of molten slag, a central portion comprising spaced cooling tubes, refractory material closing the space between the tubes, and an external casing supporting said central portion; a marginal floor portion comprising extensions of the aforementioned tubes and refractory tile secured to said extensions and closing the spaces between the same; and a slip-joint liquid-tight expansible sealing structure between the casing and the marginal floor portion.

18. In a furnace, the combination of side walls defining a combustion chamber, a floor extending between the side walls and constructed to sustain a pool of molten slag thereon and comprising a central portion formed of a set of spaced water circulating tubes and heat resistant material closing the space between tubes, the floor also including a fluid-cooled marginal portion between the central portion and a side wall, a rigid support, means for anchoring the tubes of said central portion to the support, and means preventing the escape of molten slag between said central and said marginal portion.

19. A furnace structure including walls disposed at an angle to each other to form a corner of a combustion chamber, said walls comprising spaced tubes and closures for the spaces therebetween, the tubes of one wall extending transversely of and beyond the plane of the other wall, members secured to tubes of the respective walls and portions of the members of one wall overlapping the members of the other wall in a plane substantially parallel to said other wall adjacent the corner to form a fluid-tight seal expansible in the plane of said other wall.

20. A furnace structure including walls disposed in intersecting planes, spaced tubes in each wall and closures for the spaces therebetween, tubes in each wall passing between tubes of the other wall and extending beyond the plane of said other wall, members secured to tubes of the respective walls and in overlapping relation to form a fluid-tight seal at the juncture of the two walls, said seal being expansible in the plane of one of said walls.

21. A furnace structure including opposite side walls and a floor extending therebetween, tubes in at least one of said walls and in said floor, means anchoring a portion of said floor to a lower portion of one of said walls and means providing for movement of another portion of the floor relative to said other wall, said last named means comprising members carried by wall tubes overlapping members carried by floor tubes to provide an expansible seal between said relatively movable wall and floor portions.

22. In a furnace, side walls defining a combustion chamber, a floor extending between the side walls and constructed to sustain a pool of molten slag thereon, means for anchoring a marginal portion of said floor to one of said side walls and including a liquid-tight seal, and means providing for movement of said floor in two transversely-related directions and including a seal preventing the escape of liquid between the floor and each of the other side walls.

23. In a furnace, side walls defining a combustion chamber, a floor extending between the side walls and anchored to one of them, said floor comprising spaced tubes with members engaging the tubes to form closed marginal portions, means providing a fluid-tight seal between said anchored floor portion and the adjacent side wall, and relatively movable means providing fluid-tight sealing between other marginal portions and other side walls, thereby accommodating movement of said floor in transversely related directions.

24. A furnace structure including side walls disposed at an angle to each other and a floor having marginal portions lying adjacent said side walls, means anchoring another portion of the floor, and expansible sealing means between the marginal portions and said side walls to accommodate movement of said floor with respect to said walls.

25. In a furnace, side walls defining a combustion chamber and a floor extending between the side walls, said floor comprising spaced fluid-conducting tubes and the floor having closed marginal portions, means anchoring the floor to one of said walls and providing a fluid-tight seal therebetween, and sealing means between the floor and other side walls to accommodate movement of the floor in its plane in transversely related directions.

DANA H. N. MAYO.